United States Patent
Kurabayashi (10) Patent No.: US 9,740,581 B2
(45) Date of Patent: Aug. 22, 2017

(54) FAILURE RECOVERY SCHEME FOR A CLOUD SYSTEM

(71) Applicant: Empire Technology Development LLC, Wilmington, DE (US)

(72) Inventor: Shuichi Kurabayashi, Fujisawa (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 21 days.

(21) Appl. No.: 14/443,909

(22) PCT Filed: Oct. 18, 2013

(86) PCT No.: PCT/US2013/065564
§ 371 (c)(1),
(2) Date: May 19, 2015

(87) PCT Pub. No.: WO2015/057237
PCT Pub. Date: Apr. 23, 2015

(65) Prior Publication Data
US 2015/0317217 A1    Nov. 5, 2015

(51) Int. Cl.
*G06F 11/00* (2006.01)
*G06F 11/20* (2006.01)
(Continued)

(52) U.S. Cl.
CPC .............. *G06F 11/203* (2013.01); *G06F 9/00* (2013.01); *G06F 11/00* (2013.01);
(Continued)

(58) Field of Classification Search
CPC ....... H04L 45/28; H04L 69/40; G06F 11/2028
See application file for complete search history.

(56) References Cited

U.S. PATENT DOCUMENTS 6,208,616 B1 * 3/2001 Mahalingam ............. G06F 1/20
370/216
6,314,525 B1 * 11/2001 Mahalingham ..... H04L 12/2856
370/217

(Continued)

OTHER PUBLICATIONS

"Gartner Says Worldwide Platform as a Service Revenue Is on Pace to Reach $1.2 Billion," Gartner, Stamford, Conn., accessed at http://web.archive.org/web/20130128063212/https://www.gartner.com/it/page.jsp?id=2242415, Nov. 19, 2012, pp. 1-3.

(Continued)

*Primary Examiner* — Yolanda L Wilson
(74) *Attorney, Agent, or Firm* — Brundidge & Stanger, P.C.

(57) ABSTRACT

Technologies are generally described for a failure recovery scheme for a cloud system. In some examples, the cloud system may include one or more computing nodes, and one or more network switches configured to relay one or more packets among the one or more computing nodes. A respective one of the computing nodes may include a first processor configured to process the one or more packets to communicate with at least one of the network switches, and a second processor configured to process the one or more packets to communicate with at least one of the other computing nodes in the cloud system.

19 Claims, 5 Drawing Sheets

(51) Int. Cl.
*H04L 29/08* (2006.01)
*G06F 9/00* (2006.01)
*H04L 12/931* (2013.01)
*H04L 29/14* (2006.01)
*H04L 12/703* (2013.01)

(52) U.S. Cl.
CPC .......... *G06F 11/2012* (2013.01); *H04L 45/28* (2013.01); *H04L 49/00* (2013.01); *H04L 67/10* (2013.01); *H04L 69/40* (2013.01)

(56) References Cited

U.S. PATENT DOCUMENTS

| | | | | |
|---|---|---|---|---|
| 6,424,654 | B1* | 7/2002 | Daizo | H04L 29/12283 370/401 |
| 6,618,819 | B1* | 9/2003 | Adamovits | G06F 11/2048 714/13 |
| 6,999,459 | B1 | 2/2006 | Callon et al. | |
| 8,159,940 | B1* | 4/2012 | Helmy | H04L 43/0811 370/230 |
| 2002/0059637 | A1* | 5/2002 | Rakib | G08B 13/19656 725/119 |
| 2002/0112072 | A1* | 8/2002 | Jain | H04L 45/00 709/239 |
| 2004/0252696 | A1* | 12/2004 | Kakishima | H04L 12/66 370/395.2 |
| 2005/0232261 | A1* | 10/2005 | Wybenga | H04L 49/30 370/389 |
| 2006/0013240 | A1* | 1/2006 | Ma | H04L 45/583 370/401 |
| 2008/0056120 | A1* | 3/2008 | Jha | H04L 12/4641 370/216 |
| 2008/0263255 | A1 | 10/2008 | Blinick et al. | |
| 2010/0014533 | A1 | 1/2010 | Hirano et al. | |
| 2010/0125670 | A1* | 5/2010 | Dondeti | H04L 67/1076 709/229 |
| 2011/0185067 | A1 | 7/2011 | Finn | |
| 2012/0060050 | A1 | 3/2012 | Mehta et al. | |
| 2013/0170507 | A1* | 7/2013 | Hsueh | H04L 63/0428 370/503 |

OTHER PUBLICATIONS

"NDIS Drivers," Microsoft, accessed at https://msdn.microsoft.com/en-us/library/windows/hardware/ff565448.aspx, accessed on Mar. 25, 2015, p. 1-1.

"Open Flow Switch Specification," Version 1.1.0, (Wire Protocol 0x02), pp. 1-56 (Feb. 28, 2011).

International Search Report and Written Opinion for International Application No. PCT/US2013/065564, mailed on Jun. 6, 2014.

Leong, P. H. W., "Recent Trends in FPGA Architectures and Applications," 4th IEEE International Symposium on Electronic Design, Test and Applications, pp. 137-141 (Jan. 23-25, 2008).

Magnusson, P.S., et al., "About today's App Engine Outage," accessed at http://web.archive.org/web/20121201042528/http://googleappengine.blogspot.jp/2012/10/about-todays-app-engine-outage.html accessed on Oct. 26, 2012, pp. 1-5.

Maymounkov, P., and Mazairès, D., "Kademlia: A Peer-to-Peer Information System Based on the XOR Metric," Lecture Notes in Computer Science, vol. 2429, pp. 53-65 (Oct. 10, 2002).

Stoica, I., et al., "Chord: A Scalable Peer-to-Peer Lookup Protocol for Internet Applications," IEEE/ACM Transactions on Networking, vol. 11, Issue 1, pp. 17-32 (Feb. 2003).

Yin, D., et al., "Customizing Virtual Networks with Partial FPGA Reconfiguration," ACM SIGCOMM Computer Communication Review, vol. 41, Issue 1, pp. 125-132 (Jan. 2011).

* cited by examiner

FAILURE RECOVERY SCHEME FOR A CLOUD SYSTEM

CROSS-REFERENCE TO RELATED APPLICATION

This Application is the U.S. National Stage filing under 35 U.S.C. §371 of International Application No. PCT/US2013/65564, filed on Oct. 18, 2013. The disclosure of the International Application is hereby incorporated herein by reference in its entirety.

BACKGROUND

Cloud computing services such as, for example, infrastructure-as-a-service (IaaS), platform-as-a-service (PaaS), and software-as-a-service (SaaS), have become popular. A cloud system allows users to enjoy large-scale computing power by distributing tasks into large amount of computing nodes. The computing nodes are connected to the Internet via network switches such as, for example, edge switches, core switches, and/or core routers. If a failure occurs at one of the network switches, such a failure may propagate throughout the entire cloud system, resulting in a large-scale system failure.

SUMMARY

In an example, a cloud system may include one or more computing nodes, and one or more network switches configured to relay one or more packets among the one or more computing nodes, and a respective one of the computing nodes may include a first processor configured to process the one or more packets to communicate with at least one of the network switches, and a second processor configured to process the one or more packets to communicate with at least one of the other computing nodes in the cloud system.

In another example, a computing node may include a first processor configured to process one or more packets to communicate with a network switch, and a second processor configured to process the one or more packets to communicate with another computing node.

In yet another example, a method performed under control of a computing node may include detecting a failure in communicating one or more packets with a network switch based on a first communication protocol, and transferring the one or more packets directly to a target computing node based on a second communication protocol, in response to the detecting of the failure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to a failure recovery scheme for a cloud system. Further, technologies are herein generally described for a computing node in the cloud system configured to implement the failure recovery scheme.

In some examples, the cloud system may include one or more computing nodes, and one or more network switches configured to relay one or more packets among the one or more computing nodes. A respective one of the computing nodes may include a first processor configured to process the one or more packets to communicate with at least one of the network switches, and a second processor configured to process the one or more packets to communicate with at least one of the other computing nodes in the cloud system when the first processor is not able to communicate the one or more packets with the at least one of the network switches. The second processor may be a network interface controller (NIC) in which a field programmable gate array (FPGA) is embedded, i.e., an FPGA-embedded NIC. The network switches may include, but are not limited to, edge switches, core switches, and/or core routers.

In some examples, the respective computing nodes may be configured to detect a failure in communicating the one or more packets with the at least one of the network switches, and transfer the one or more packets directly to at least one of the other computing nodes in the cloud system (i.e., a target computing node) in response to the detecting of the failure. By way of example, but not limitation, the respective computing nodes may calculate a distance between an IP (Internet Protocol) address of a destination computing node (i.e., a computing node to which the one or more packets to be sent) and an IP address of each of the other computing nodes connected to the computing node, and select the target computing node as one of the other computing nodes that is closest to the destination computing node. In some further examples, when the respective one of the computing nodes detects a recovery from the failure, it may transfer the one or more packets to the at least one of the network switches, in response to the detecting of the recovery. That is, the respective computing nodes may communicate the one or more packets directly with one another when the failure occurs, while communicate the one or more packets via the network switches when there is no failure in the cloud system.

In some examples, the second processors included in the respective computing nodes may communicate with one another using an overlay network protocol between link layer and network layer, so that the failure recovery scheme described herein may be implemented without modifying existing legacy software and/or hardware.

Figure 1:
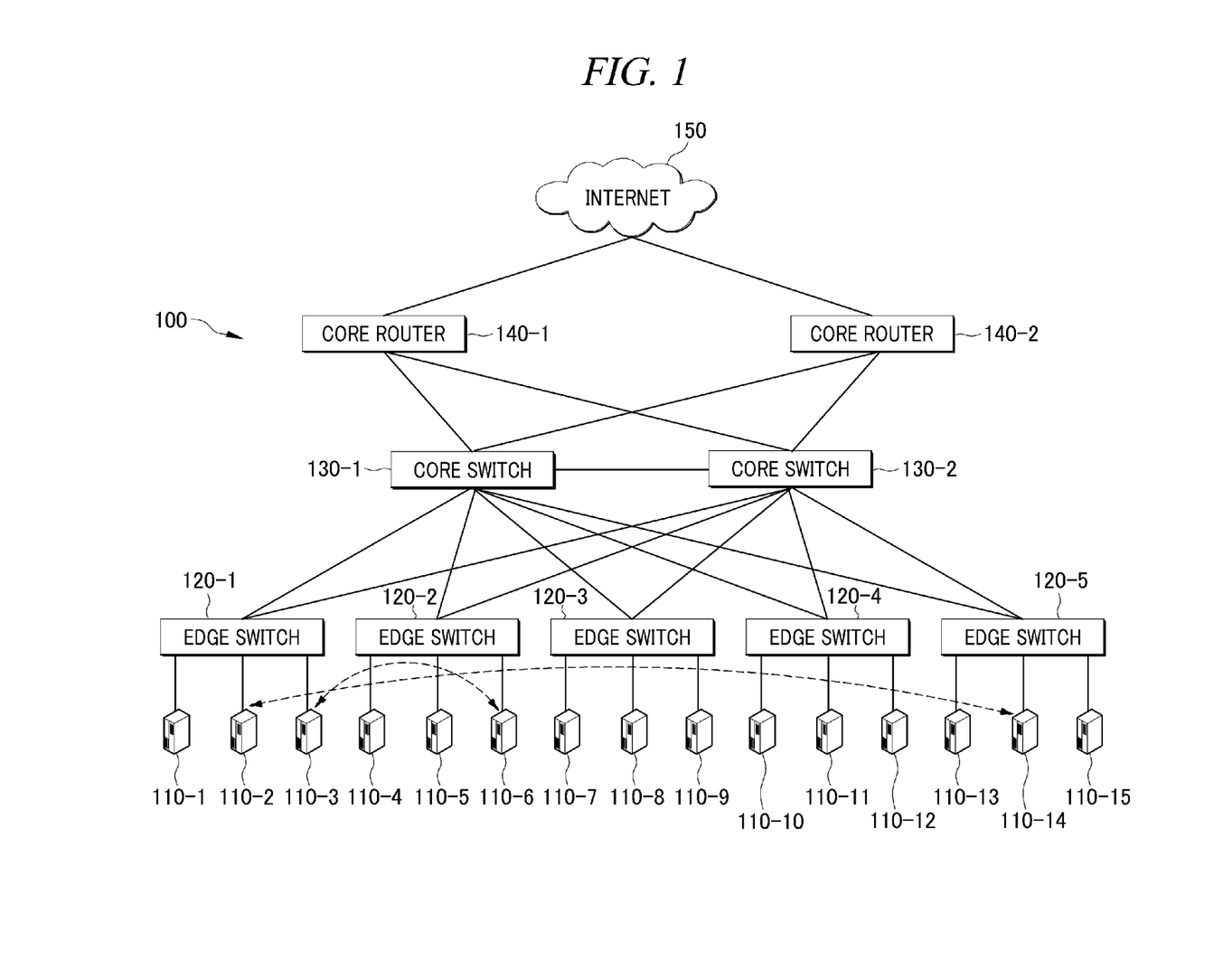
FIG. 1 schematically shows an illustrative example of a cloud system including multiple computing nodes, arranged in accordance with at least some embodiments described herein.

FIG. 1 schematically shows an illustrative example of a cloud system 100 including multiple computing nodes, arranged in accordance with at least some embodiments described herein.

As depicted, cloud system 100 may include computing nodes 110-1, 110-2, 110-3, 110-4, 110-5, 110-6, 110-7, 110-8, 110-9, 110-10, 110-11, 110-12, 110-13, 110-14 and 110-15 (collectively, computing nodes 110). Each of computing nodes 110 may serve as a client or a server (e.g., a web server, an application server, a storage, etc.), depending on the desired implementation. Respective computing nodes 110 may be connected to one of edge switches 120-1, 120-2, 120-3, 120-4 and 120-5 (collectively, edge switches 120). For instance, as depicted, computing nodes 110-1, 110-2 and 110-3 may be connected to edge switches 120-1; computing nodes 110-4, 110-5 and 110-6 may be connected to edge switches 120-2; computing nodes 110-7, 110-8 and 110-9 may be connected to edge switches 120-3; computing nodes 110-10, 110-11 and 110-12 may be connected to edge switches 120-4; and computing nodes 110-13, 110-14 and 110-15 may be connected to edge switches 120-5. Further, respective edge switches 120-1, 120-2, 120-3, 120-4 and 120-5 may be connected to core switches 130-1 and 130-2 (collectively, core switches 130), and respective core switches 130-1 and 130-2 may be connected to core routers 140-1 and 140-2 (collectively, core routers 140). In this regard, respective computing nodes 110 may communicate with the Internet 150 via at least some of edge switches 120, core switches 130, and core routers 140. That is, each of computing nodes 110 in cloud system 100 may transmit/receive one or more packets via at least some of edge switches 120, core switches 130, and core routers 140 to/from other computing nodes external to cloud system 100 and/or other computing nodes 110 in cloud system 100. Edge switches 120, core switches 130 and core routers 140 may be collectively called as network switches.

In some embodiments, each of computing nodes 110 in cloud system 100 may also directly communicate with other computing nodes 110 in cloud system 100. For instance, as depicted, computing node 110-2 may directly communicate with computing node 110-14, and computing node 110-3 may directly communicate with computing node 110-6. Such a peer-to-peer (P2P) communication may be activated and/or enabled when at least one of computing nodes 110 detects a failure in communicating one or more packets with network switches 120, 130 and/or 140 (i.e., at least some of edge switches 120, core switches 130, and core routers 140). The peer-to-peer communication among computing nodes 110 may construct a failure recovery network.

Figure 2:
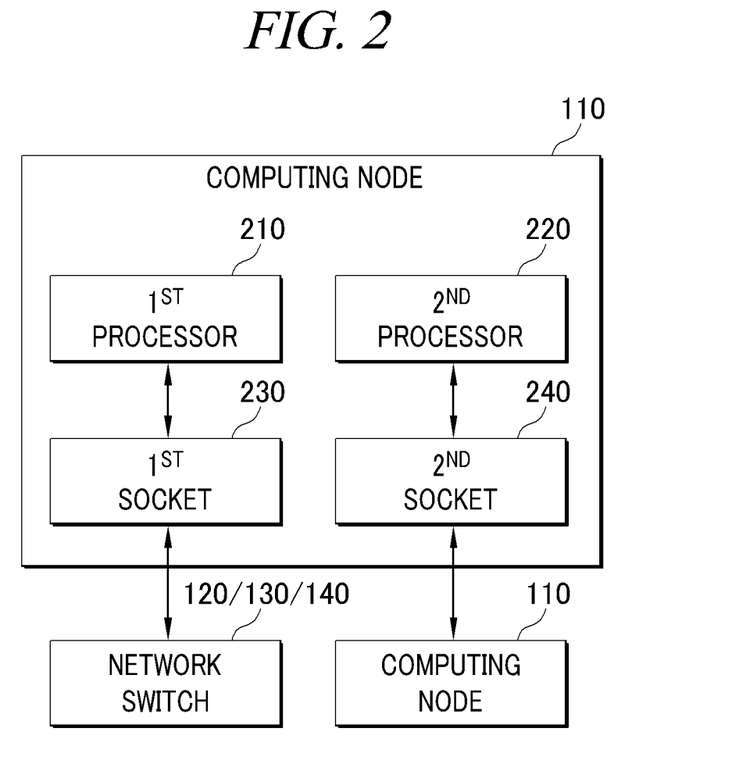
FIG. 2 shows a schematic block diagram illustrating an example architecture of a computing node for implementing a failure recovery scheme, arranged in accordance with at least some embodiments described herein.

FIG. 2 shows a schematic block diagram illustrating an example architecture of computing node 110 for implementing a failure recovery scheme, arranged in accordance with at least some embodiments described herein.

Computing node 110 may be one of computing nodes 110-1, 110-2, 110-3, 110-4, 110-5, 110-6, 110-7, 110-8, 110-9, 110-10, 110-11, 110-12, 110-13, 110-14 and 110-15 that may be included in cloud system 100. In this regard, reference may be made to the embodiments depicted and described with reference to FIG. 1.

As depicted, computing node 110 may include a first processor 210, a second processor 220, a first socket 230 and a second socket 240. Although illustrated as discrete components, various components may be divided into additional components, combined into fewer components, or eliminated while being contemplated within the scope of the disclosed subject matter. It will be understood by those skilled in the art that each function and/or operation of the components may be implemented, individually and/or collectively, by a wide range of hardware, software, firmware, or any combination thereof.

First processor 210 may be configured to process one or more packets to communicate with at least one of network switches 120, 130 and/or 140. First processor 210 may be connected to at least one of network switches 120, 130 and/or 140 via first socket 230. By way of example, but not limitation, first socket 230 may be an Ethernet socket.

Second processor 220 may be configured to process the one or more packets to communicate with another computing node 110 in cloud system 100. Second processor 220 may be connected to the other computing node 110 via second socket 240. By way of example, but not limitation, second processor 220 may be a network interface controller (NIC) in which a programmable processor, such as a field programmable gate array (FPGA) configured to implement L3 packet processing, may be embedded. By way of example, but not limitation, second socket 240 may also be an Ethernet socket.

In some embodiments, computing node 110 may be configured to enable second processor 220 to process the one or more packets when first processor 210 is not able to communicate the one or more packets with the at least one of network switches 120, 130 and/or 140 (e.g., when a failure occurs in communicating the one or more packets with the at least one of network switches 120, 130 and/or 140). In some further embodiments, computing node 110 may be configured to enable first processor 210 to process the one or more packets and disable second processor 220, when first processor 210 is normally able to communicate the one or more packets with the at least one of network switches 120, 130 and/or 140 (e.g., when the failure is recovered).

In some embodiments, when cloud system 100 detects the failure in communicating the one or more packets with the at least one of network switches 120, 130 and/or 140, cloud system 100 may determine, from among other computing nodes connected to computing node 110, a target computing node to transfer the one or more packets. By way of example, but not limitation, computing node 110 may calculate a distance between an IP (Internet Protocol) address of a destination computing node and an IP address of each of the other computing nodes connected to computing node 110 (e.g., based on integer subtraction between the IP addresses), and select the target computing node as one of the other computing nodes that is closest to the destination computing node. Then, in some embodiments, computing node 110 may transfer the one or more packets directly to the target computing node. Packet transmission between computing node 110 and the other computing nodes in cloud system 100 will be described below with reference to FIG. 4.

In some embodiments, first processor 210 may communicate the one or more packets with the at least one of network switches 120, 130 and/or 140 based on a first communication protocol, while second processor 220 may transfer the one or more packets to the target computing node based on a second communication protocol. The second communication protocol may be a peer-to-peer communication protocol between computing node 110 and the other computing nodes in cloud system 100. In some embodiments, the second communication protocol may be an overlay network protocol between link layer and network layer, that may be implemented by the field programmable gate array (FPGA) included in second processor 220. Protocol stack that may be employed by second processor 220 will be described below with reference to FIG. 5.

Figure 3:
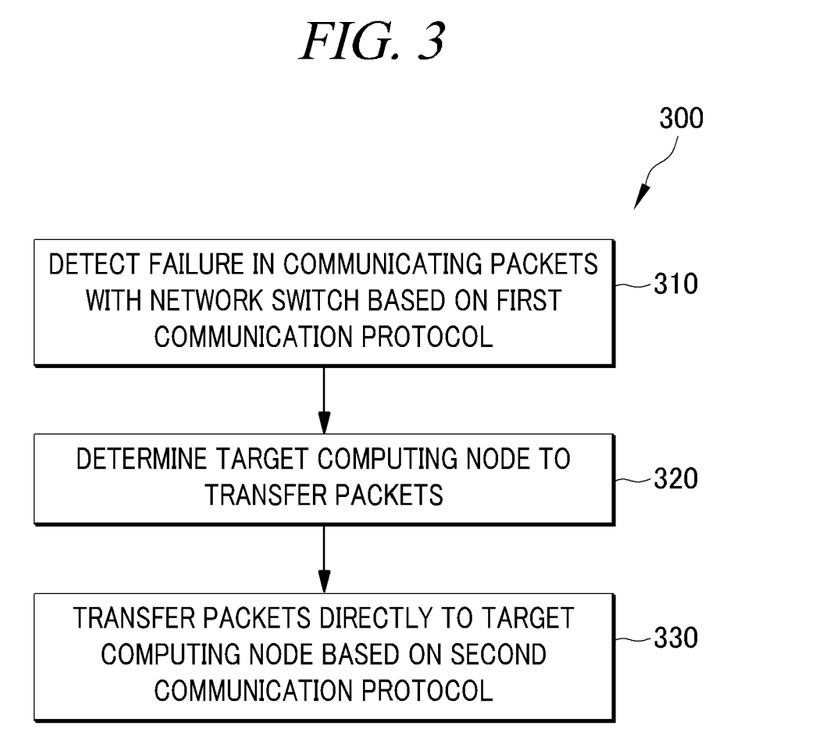
FIG. 3 shows an example flow diagram of a process for implementing a failure recovery scheme, arranged in accordance with at least some embodiments described herein.

FIG. 3 shows an example flow diagram of a process 300 for implementing a failure recovery scheme, arranged in accordance with at least some embodiments described herein.

Process 300 may be implemented in a computing node such as computing node 110 including, for example, first processor 210, second processor 220, first socket 230 and second socket 240. Thus, reference may be made to the embodiments depicted and described with reference to FIGS. 1-2. Process 300 may include one or more operations, actions, or functions as illustrated by one or more blocks 310, 320 and/or 330. Although illustrated as discrete blocks, various blocks may be divided into additional blocks, combined into fewer blocks, or eliminated, depending on the desired implementation. Processing may begin at block 310.

At block 310 (Detect Failure in Communicating Packets with Network Switch Based on First Communication Protocol), computing node 110 may detect a failure in communicating one or more packets with a network switch (e.g., at least one of edge switches 120, core switches 130, and core routers 140) based on a first communication protocol. Processing may continue from block 310 to block 320.

At block 320 (Determine Target Computing Node to Transfer Packets), computing node 110 may determine, from among other computing nodes connected to computing node 110, a target computing node to transfer the one or more packets. In some embodiments, computing node 110 may calculate a distance between an IP (Internet Protocol) address of a destination computing node and an IP address of each of the other computing nodes connected to computing node 110 (e.g., based on integer subtraction between the IP addresses). Then, computing node 110 may select the target computing node, as one of the other computing nodes, that is closest to the destination computing node, as will be described below with reference to FIG. 4. Processing may continue from block 320 to block 330.

At block 330 (Transfer Packets Directly to Target Computing Node Based on Second Communication Protocol), computing node 110 may transfer the one or more packets directly to the target computing node based on a second communication protocol, which may be implemented by, for example, a field programmable gate array (FPGA) included in computing node 110. In some embodiments, the second communication protocol may be different from the first communication protocol, in that the second communication protocol may be a peer-to-peer communication protocol between computing node 110 and the other computing nodes. Further, the second communication protocol may be an overlay network protocol between link layer and network layer, as will be described below with reference to FIG. 5.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
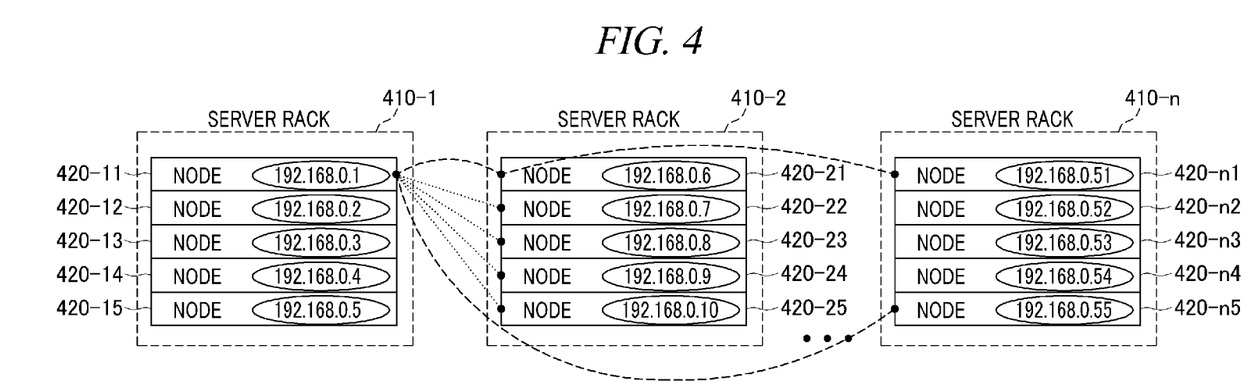
FIG. 4 schematically shows packet transmission between computing nodes in a cloud system, arranged in accordance with at least some embodiments described herein.

FIG. 4 schematically shows packet transmission between computing nodes in cloud system 100, arranged in accordance with at least some embodiments described herein. Reference may be made to the embodiments depicted and described with reference to FIGS. 1-3.

As depicted, server racks 410-1, 410-2 . . . , and 410-$n$ may respectively include computing nodes 420-11, 420-12, 420-13, 420-14 and 420-15, computing nodes 420-21, 420-22, 420-23, 420-24 and 420-25, . . . , and computing nodes 420-$n$1, 420-$n$2, 420-$n$3, 420-$n$4 and 420-$n$5. Respective computing nodes 420-11, 420-12, 420-13, 420-14, 420-15, 420-21, 420-22, 420-23, 420-24, 420-25, . . . , 420-$n$1, 420-$n$2, 420-$n$3, 420-$n$4 and 420-$n$5 (collectively, computing nodes 420) may be components of cloud system 100, such as computing nodes 110.

In some embodiments, each of computing nodes 420 may include a network interface controller (NIC) in which a field programmable gate array (FPGA) capable of L3 packet processing is embedded (i.e., an FPGA-embedded NIC). Based on such a function of L3 packet processing, computing nodes 420 may directly communicate with one another when a failure occurs in cloud system 100.

In some embodiments, each of computing nodes 420 may determine, from among other computing nodes connected thereto, a target computing node to transfer one or more packets. By way of example, but not limitation, each of computing nodes 420 may determine the target computing node based on the relationships of IP (Internet Protocol) addresses of respective computing nodes 420, which may be expressed as 32-bit unsigned integers. The IP addresses of respective computing nodes 420 may range uniformly over a 32-bit integer space without overlapping, so that respective computing nodes 420 may calculate a distance with any other computing nodes in cloud system 100.

In some embodiments, as shown in FIG. 3, the FPGA-embedded NICs of computing nodes 420 are connected densely to nearby computing nodes, while sparsely to far computing nodes. In some further embodiments, the connections with the nearby computing nodes may be via a wireless network such as WLAN (Wireless Local Area Network), thereby reducing the number of physical wires, while the connections with the far computing nodes may be wired such as via cables.

In some embodiments, each of computing nodes 420 may determine, from among the other computing nodes connected thereto, the target computing node as a computing node that is closest to a destination computing node. By way of example, but not limitation, upon receiving a packet originated from a source computing node, the FPGA-embedded NIC of each of computing nodes 420 may calculate the distances between the IP address of the destination computing node and the IP addresses of the other computing nodes connected thereto (e.g., by integer subtraction), determine, based on the calculation of the distances, the target computing node that is closest to the destination computing node, and transfer the packet to the determined target computing node. By repeating such packet transfer, the packet may reach the destination computing node. Since a search time converges in logarithmic time in cases where an IP address search range is narrowed to 1/d (where d is a natural number not less than 2) on each packet transfer, when the IP address search range is narrowed to half on each packet transfer (i.e., d=2), $\log_2(N)$ may be less than 20 even when the number of computing nodes N is nearly 1 million. Accordingly, when the number of nodes is N, it may be possible to send a packet to the destination computing node with at most $O(\log_2(N))$ packet transfers. Further, fault tolerance may increase since no computing node has to be connected to all of the other computing nodes, and each computing node may operate symmetrically.

By way of example, but not limitation, it may be assumed that computing node 420-11, the IP address of which is 192.168.0.1, tries to send a packet to computing node 420-$n$2, the IP address of which is 192.168.0.52. That is, in this example, the source computing node is computing node 420-11, while the destination computing node is computing node 420-$n$2. In this example, it may also be assumed that source computing node 420-11 has physical connections to the other computing nodes in the same server rack 410-1 (i.e., computing nodes 420-12, 420-13, 420-14 and 420-15), computing nodes 420-21, 420-22, 420-23, 420-24 and 420-25 in neighboring server rack 410-2, and computing node 420-$n$1 in server rack 410-$n$, while does not have any direct physical connection to destination computing node 420-$n$2. Source computing node 420-11 may select a target computing node that is closest to destination computing node 420-$n$2 from among computing nodes 420-12, 420-13, 420-14, 420-15, 420-21, 420-22, 420-23, 420-24, 420-25 and 420-$n$1, which are respectively connected to source computing node 420-11. In such cases, source computing node 420-11 may calculate the distance between destination computing node 420-$n$2 and each of computing nodes 420-12, 420-13, 420-14, 420-15, 420-21, 420-22, 420-23, 420-24, 420-25 and 420-$n$1, by comparing magnitudes of the IP addresses (e.g., 32-bit unsigned integers) of destination computing node 420-$n$2 and each of computing nodes 420-12, 420-13, 420-14, 420-15, 420-21, 420-22, 420-23, 420-24, 420-25 and 420-$n$1. That is, source computing node 420-11 may search the IP address with the least difference from the IP address of destination computing node 420-$n$2, i.e., 192.168.0.52 (that may be converted into a 32-bit unsigned integer 3232235572). In this example, source computing node 420-11 may determine the target computing node as computing node 420-$n$1, the IP address of which is 192.168.0.51 (that may be converted into a 32-bit unsigned integer 3232235571), and send the packet to computing node 420-$n$1. Then, since computing node 420-$n$1 is connected to destination computing node 420-$n$2 (that is, computing node 420-$n$1 and destination computing node 420-$n$2 are in the same server rack 410-$n$), computing node 420-$n$1 may transfer the packet to destination computing node 420-$n$2.

Although FIG. 4 illustrates that server racks 410-1, 410-2 . . . , and 410-$n$ respectively include five computing nodes, those skilled in the art will readily appreciate that server racks 410-1, 410-2 . . . , and 410-$n$ may respectively include any number of computing nodes.

Figure 5:
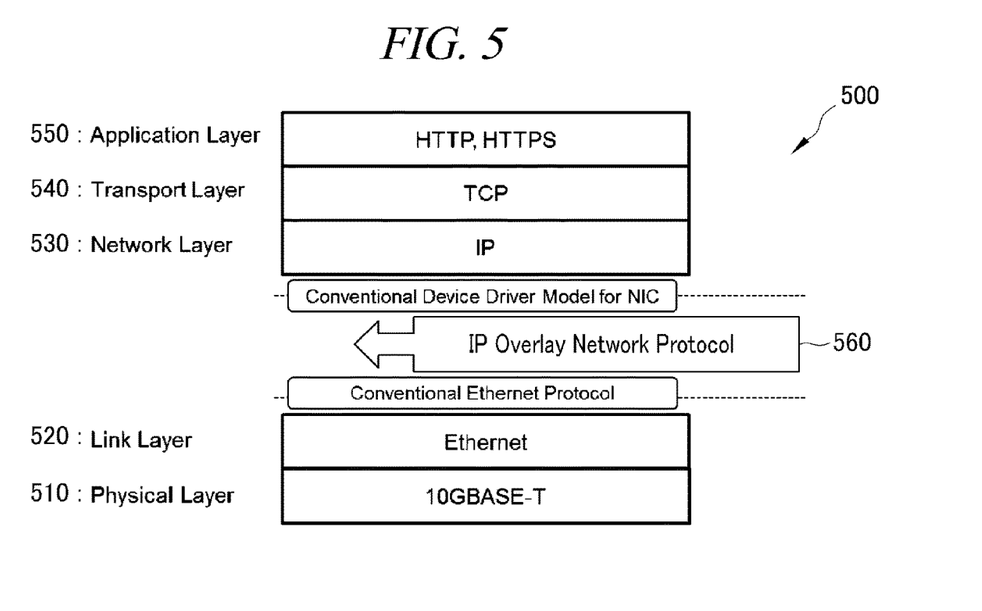
FIG. 5 schematically shows a protocol stack employed by a computing node, arranged in accordance with at least some embodiments described herein.

FIG. 5 schematically shows a protocol stack 500 employed by a computing node, arranged in accordance with at least some embodiments described herein. Reference may be made to the embodiments depicted and described with reference to FIGS. 1-4.

As depicted, protocol stack 500 may include a physical layer 510 (e.g., 10GBASE-T), a link layer 520 (e.g., Ethernet), a network layer 530 (e.g., IP), a transport layer 540 (e.g., TCP (Transmission Control Protocol)), and an application layer 550 (e.g., HTTP (Hypertext Transfer Protocol), HTTPS (Hypertext Transfer Protocol Secure)). An IP overlay network protocol 560 for enabling IP packet transfer between computing nodes may be implemented between link layer 520 and network layer 530.

In some embodiments, by embedding field programmable gate arrays (FPGAs) that may execute processing for IP overlay network protocol 560 in network interface controllers (NICs) in the computing nodes, thereby executing autonomous packet transfer processing, it may be possible to implement the failure recovery scheme described herein without modifying existing legacy software or the hardware of existing Ethernet networks. Further, by employing the FPGA-embedded NICs as an interface between link layer 520 and network layer 530, it may be possible to implement device drivers in compliance with network device models provided by existing operating systems. By way of example, but not limitation, Network Driver Interface Specification (NDIS), which is a network device driver model for Microsoft Windows, and defines an interface between link layer and network layer, may be applicable for implementing the failure recovery scheme described herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an"

limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A cloud system comprising:
   one or more computing nodes; and
   one or more network switches configured to relay one or more packets among the one or more computing nodes,
   wherein a respective one of the one or more computing nodes includes:
   a first processor configured to process transmission and reception of the one or more packets with at least one of the one or more network switches; and
   a second processor configured to process the transmission and the reception of the one or more packets directly with at least one of the other computing nodes in the cloud system,
   wherein the at least one of the other computing nodes is connected to the respective one of the one or more computing nodes.

2. The cloud system of claim 1, wherein the respective one of the one or more computing nodes enables the second processor to process the one or more packets when the first processor is not able to communicate the one or more packets with the at least one of the one or more network switches.

3. The cloud system of claim 1, wherein the second processor included in the respective one of the one or more computing nodes is implemented by a field programmable gate array (FPGA).

4. The cloud system of claim 1, wherein the second processor included in the respective one of the one or more computing nodes is a network interface controller (NIC) in which a field programmable gate array (FPGA) is embedded.

5. The cloud system of claim 1, wherein the second processors included in the respective one or more computing nodes construct a failure recovery network.

6. The cloud system of claim 1, wherein the second processors included in the respective one or more computing nodes communicate with one another by use of an overlay network protocol between a link layer and a network layer.

7. The cloud system of claim 1, wherein the one or more network switches include at least one of edge switches, core switches, or core routers.

8. A computing node, comprising:
   a first processor configured to process transmission and reception of one or more packets with a network switch; and
   a second processor configured to process the transmission and the reception of the one or more packets directly with another computing node,
   wherein the other computing node is connected to the computing node.

9. The computing node of claim 8, wherein the computing node enables the second processor to process the one or more packets when the first processor is not able to communicate the one or more packets with the network switch.

10. The computing node of claim 8, wherein the second processor is implemented by a field programmable gate array (FPGA).

11. The computing node of claim 8, wherein the second processor includes a network interface controller (NIC) in which a field programmable gate array (FPGA) is embedded.

12. The computing node of claim 8, wherein the first processor is further configured to be connected to the network switch via a first Ethernet socket, and wherein the second processor is further configured to be connected to the other computing node via a second Ethernet socket.

13. A method performed under control of a computing node, the method comprising:
- detecting a failure in communicating one or more packets with a network switch based on a first communication protocol;
- determining, from among other computing nodes connected to the computing node, a target computing node to transfer the one or more packets; and
- transferring the one or more packets directly to the target computing node based on a second communication protocol, in response to the detection of the failure.

14. The method of claim 13, wherein the determining comprises:
- calculating a distance between an IP (Internet Protocol) address of a destination computing node and an IP address of each of the other computing nodes connected to the computing node; and
- selecting the target computing node, as one of the other computing nodes, that is closest to the destination computing node.

15. The method of claim 14, wherein the calculating is based on integer subtraction between the IP addresses.

16. The method of claim 13, wherein the second communication protocol is a peer-to-peer communication protocol between the computing node and the other computing nodes.

17. The method of claim 13, wherein the second communication protocol is an overlay network protocol between a link layer and a network layer.

18. The method of claim 13, wherein the second communication protocol is implemented by a field programmable gate array (FPGA) included in the computing node.

19. The method of claim 13, further comprising:
- detecting a recovery from the failure; and
- transferring the one or more packets to the network switch based on the first communication protocol, in response to the detection of the recovery.

* * * * *